(No Model.)
W. CATTON.
SLEEVE FOR RECIPROCATING RODS.
No. 594,358. Patented Nov. 23, 1897.
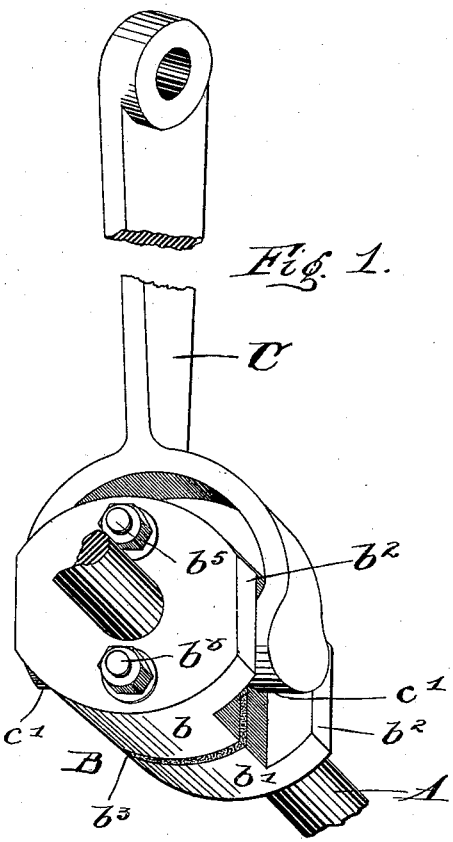
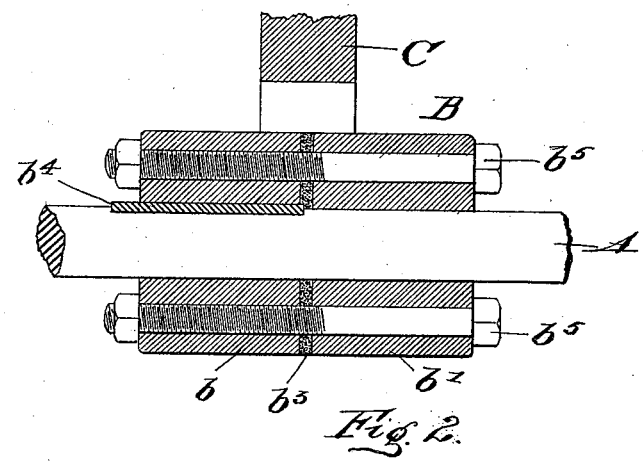
WITNESSES
Edw. P. Wood
J. M. Wood
INVENTOR.
William Catton
BY
A. A. Woodson
ATTORNEYS

UNITED STATES PATENT OFFICE.

WILLIAM CATTON, OF ATLANTA, GEORGIA.

SLEEVE FOR RECIPROCATING RODS.

SPECIFICATION forming part of Letters Patent No. 594,358, dated November 23, 1897.

Application filed June 8, 1897. Serial No. 639,888. (No model.)

*To all whom it may concern:*

Be it known that I, WILLIAM CATTON, a citizen of the United States of America, and a resident of Atlanta, in the county of Fulton and State of Georgia, have made a certain new and useful Invention in Sleeves for Reciprocating Rods; and I hereby declare the following to be a full, clear, and exact description of the invention, such as will enable others skilled in the art to which it appertains to make and use the same, reference being had to the accompanying drawings, and to letters of reference marked thereon, which form a part of this specification.

This invention relates to means for operatively connecting one end of a lever to a reciprocating rod, the object of the invention being to provide means for adjusting said sleeve so as to prevent pounding and unnecessary wear, the details of which device will be hereinafter set forth.

The accompanying drawings show, in Figure 1, a perspective view of the device properly connected, and, in Fig. 2, a longitudinal section.

A is a reciprocating rod. B is the sleeve, and C is the lever. The lever C is bifurcated at its lower end and is provided with circular inwardly-projecting lugs $c'$ on its bifurcated ends. The sleeve B, which is composed of two sections $b$ and $b'$, is longitudinally bored and fits upon the rod A, being flattened on each side, as shown, and having flanges $b^2$ on the outer end of each section, whereby a squared notch is obtained in each side of the sleeve formed of the two sections assembled.

$b^3$ is a shim of compressible material, which is placed between the contiguous ends of the sections $b$ and $b'$, and by the compression of which the flanges $b^2$ may be brought closer together. The section $b$ of the sleeve is keyed to the rod A by means of a tapered key $b^4$, which holds that section constant in its position upon the rod. Bolt-holes are bored longitudinally through both sections of the sleeves, and bolts $b^5$ pass therethrough and clamp the two sections in position relative to each other. The section $b$ being keyed to the shaft is stationary thereon unless the key should be removed, and the section $b'$ is movable on the shaft and may be caused to approach the section $b$ by tightening on the bolts $b^5$, which will compress the shim $b^3$ and bring the lips $b^2$ closer together, fitting more closely against the periphery of the inwardly-projecting portions $c'$ of the lever C. The shim $b^3$ should be of rubber or some material which is in itself resilient, so that there may be no movement of the sections $b$ and $b'$, except under compression of the bolts $b^5$. Obviously when the lips $b^2$ are brought closer together the engagement with the lugs $c'$ will be closer and all lost motion be taken up.

Having thus described my invention, what I claim as new, and desire to secure by Letters Patent of the United States, is—

1. In a sleeve for a reciprocating rod, a reciprocating rod, a cross-head consisting of two blocks, one secured to said rod and the other sliding upon said rod, an intervening shim of elastic material and means for clamping the two sections of the cross-head together, lips on the outer end of each block projecting laterally and a bifurcated lever pivotally secured and lugs on its bifurcated end lying between said lips.

2. In a sleeve for a reciprocating rod, a reciprocating rod, a cross-head consisting of two blocks, one secured to said rod and the other sliding upon said rod, an intervening shim of elastic material and means for clamping the two sections of the cross-head together consisting of bolts passing through said sections and nuts thereon, lips on the outer end of each block projecting laterally, and a bifurcated lever pivotally secured and lugs on its bifurcated end lying between said lips.

3. In a sleeve for reciprocating rods, a combination of a reciprocable rod, a cross-head thereon consisting of two sections mounted thereon, one secured to said rod and the other movable thereon, an intervening shim of elastic material, lips on the outer end of each of the sections of said cross-head, and projecting laterally therefrom, and a bifurcated lever pivotally mounted adapted to be connected to operative mechanism, and bifurcated at its end, said bifurcation lying between the respective lips of said cross-head, and inwardly-projecting lugs on said bifurcation and adapted to contact with said lips, substantially as and for the purpose specified.

In testimony whereof I hereunto affix my signature in presence of two witnesses.

WILLIAM CATTON.

Witnesses:
A. P. WOOD,
M. BROWN.